United States Patent [19]

Takeda et al.

[11] 4,307,055
[45] Dec. 22, 1981

[54] APPARATUS AND PROCESS FOR NOODLING GELATIN DISPERSION

[75] Inventors: Motoaki Takeda; Shinji Uematsu, both of Minami-ashigara, Japan

[73] Assignee: Fuji Photo Film Co., Ltd., Minami-ashigara, Japan

[21] Appl. No.: 100,806

[22] Filed: Dec. 6, 1979

[30] Foreign Application Priority Data

Dec. 6, 1978 [JP] Japan .................. 53-151221

[51] Int. Cl.³ .......................................... D01D 5/08
[52] U.S. Cl. ............................ 264/178 F; 264/202; 425/67; 425/382 R; 430/642
[58] Field of Search .......... 264/178 F; 425/67, 382 R; 430/642

[56] References Cited

U.S. PATENT DOCUMENTS

| | | | |
|---|---|---|---|
| 1,389,517 | 8/1921 | Kitsee | 425/67 |
| 2,238,591 | 4/1941 | Horesi et al. | 264/38 |
| 2,273,082 | 2/1942 | Aldrich | 425/67 |
| 2,316,845 | 4/1943 | Craft | 430/642 |
| 2,598,608 | 5/1952 | Salo et al. | 425/67 |
| 3,223,756 | 12/1965 | Goodyear et al. | 425/67 |
| 3,352,950 | 11/1967 | Helton et al. | 425/67 |
| 3,396,027 | 8/1968 | McFall et al. | 264/178 F |
| 3,794,731 | 2/1974 | Dannert et al. | 426/802 |

FOREIGN PATENT DOCUMENTS 473332 1/1915 France .................. 425/70

*Primary Examiner*—Jay H. Woo
*Attorney, Agent, or Firm*—Sughrue, Mion, Zinn, Macpeak and Seas

[57] ABSTRACT

An apparatus for noodling a gelating dispersion which continuously gels and noodles the gelatin dispersion and supplies noodles of the dispersion into cold water in a washing tank, said apparatus comprising a means for supplying a predetermined quantity of said dispersion to an extruder at a predetermined pressure, said extruder comprising a plurality of supply nozzles that extend from a receiving chamber for said dispersion which are preferably made of a material having higher thermal conductivity than the walls of the chamber, and a washing tank to which cold water has free access, the supply nozzles of said extruder being so arranged as to be immersed in the cold water in said washing tank, to thereby promote gelation of said dispersion flowing down through each of said nozzles and to form firmer and stabler noodles.

5 Claims, 2 Drawing Figures

APPARATUS AND PROCESS FOR NOODLING GELATIN DISPERSION

BACKGROUND OF THE INVENTION

1. Field of the Invention

This invention relates to an apparatus for continuous gelatin and noodling of a gelatin dispersion, and more particularly to an improved apparatus for achieving efficient water-washing of a photographic gelatin dispersion by forming noodles of relatively small diameter from said dispersion so as to increase the surface area to volume ratio of a gelled dispersion.

The term "gelatin dispersion" as used herein includes a photosensitive silver halide emulsion prepared by mixing solutions of potassium bromide and silver nitride in the presence of gelatin made of cattle hide or bone which is optionally mixed with an additive, and a dispersion of color-forming coupler dissolved in a mixture of an organic solvent and a water-soluble auxiliary solvent or a solvent of low water solubility, the resulting solution then being emulsified in a water soluble gelatin solution. Prior to coating on a support, such "gelatin dispersion" is freed of any water soluble by-product or auxiliary solvent that is deleterious to the quality of a photographic product. The "gelatin dispersion" is hereunder sometimes referred to as a dispersion.

2. Description of the Prior Art

An efficient method of removing water soluble by-products and auxiliary solvent from a gelatin dispersion by making noodles of the dispersion is described in U.S. Pat. No. 3,396,027 wherein dispersions directly from the mixing operation and a colloid mill or homogenizer used in their preparation are passed continuously through the porous diaphragm or head of an extruder made of a heat insulating material such as glass or polystyrene into cold water in a washing tank to prepare gelled noodles of the dispersion as well as to free the noodles of the aforementioned impurities that are dissolved in the cold water.

The method combines the gelatin and noodling of the dispersion into a continuous flow process, thus not only obviating a large-capacity cooling unit for gelling the dispersion and temporarily storing the gelled dispersion but also achieving significant reduction in the pressure necessary for extruding the gelled dispersion into noodles. However, since the method employs an extruder made of a heat insulating material, the rate of cooling the dispersion upstream of the porous diaphragm is so low that to provide noodles stable against the subsequent washing with cold water accompanied by some degree of agitating effect, either the temperature at which the dispersion was prepared or the temperature of the cold water must be lowered, or the quantity of the dispersion to be extruded through the porous diaphragm into the cold water must be reduced. But to lower the temperature of the cold water means an increased load on the apparatus for producing cold water, and if the temperature of the dispersion to be supplied is decreased, the dispersion becomes highly viscous and requires higher pressure for extrusion. An attempt to throttle the dispersion to be extruded by reducing the diameter of each orifice in the porous diaphragm results only in noodles which easily break down to cause some of them to be lost as "fines".

Therefore, various studies have been made on the relationship between the construction or material of the extruder, particularly its porous diaphragm, and the stability of the noodles, and the apparatus of this invention which will be described hereunder has resulted.

SUMMARY OF THE INVENTION

One object of the present invention is to provide an apparatus for noodling a gelatin dispersion which is free from the aforementioned defects of the conventional technique.

Another object of the present invention is to provide compact apparatus for noodling a gelatin dispersion which is capable of forming noodles of the dispersion that are stable in both shape and property.

These objects of the present invention are accomplished by an apparatus for noodling a gelatin dispersion comprising means for supplying a predetermined quantity of the dispersion at a predetermined pressure to an extruder comprising a plurality of supply nozzles that extend from a chamber for receiving the dispersion and which are preferably made of a material having higher thermal conductivity than the walls of the chamber, and a washing tank to which cold water has free access, the supply nozzles of the extruder being so arranged as to be immersed in the cold water in the washing tank, to thereby promote gelatin of the dispersion flowing down through each of the nozzles and to form firmer and stabler noodles which are fed into cold water in accordance with conventional practice.

DETAILED DESCRIPTION OF THE INVENTION

Figure 1:
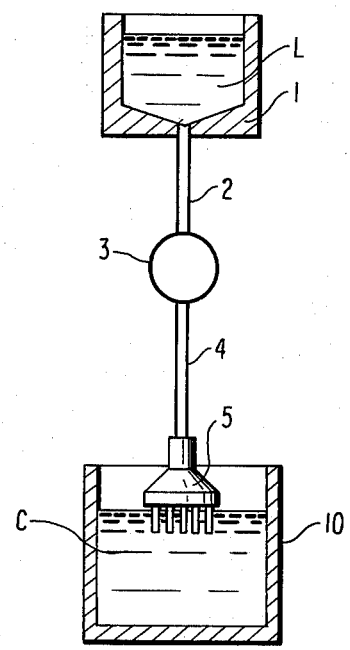
FIG. 1 is a schematic diagram illustrating a general view of an apparatus according to one embodiment of this invention.

A photographic gelatin dispersion L from the last stage of mixing operation and its preparation is transferred in a suitable quantity to a supply container 1 where it stays for a short period of time before it is transferred through metering/pumping means which comprise conduits 2 and 4 and a metering pump 3 and optionally a flow rate sensing means (not shown) to an extruder 5 at a predetermined flow rate and at a predetermined pressure which is only slightly additional to that supplied by gravity and is generally in the range of from about 0.6 to 1.5 $Kg/cm^2(G)$.

The dispersion L supplied to the extruder 5 fills a liquid receiving chamber 7 having a connecting portion 6 into which the lower end of the conduit 4 is threaded and which has a lower extension that is generally conical and which is provided at the bottom 8 with a plurality of tubular supply nozzles 9 extending downwardly of the cone; the dispersion then flows down through the nozzles 9 at generally constant flow rate and pressure to be forced out of the extruder 5.

The material and construction of the extruder 5 according to this invention will hereunder be described. Each member of the chamber 7 excepting the connecting portion 6 and the supply nozzles 9 is made of a material which is a good heat insulator such as plastic or metal lined with plastic. The supply nozzles 9 are made of a material having relatively high heat conductivity such as stainless steel, brass or aluminum. The number of the nozzles, the overall length of nozzle 1, the inside diameter of nozzle ID and nozzle pitch P are properly determined by considering such factors as the temperature, pressure, viscosity and flow rate of the dispersion L being supplied as well as the temperature of cold water C in a washing tank 10 as will be described hereinafter. If the dispersion L has a viscosity in the range of from 300 to 10,000 cps and is supplied at a temperature between 25° and 54° C., at a flow rate of 1.5 to 15 liters/min in cold water C having a temperature in the range of from 2° to 24° C. gelatin and noodling (which will be described hereinafter) of such dispersion generally requires 60 and 600 supply nozzles each having an overall length l of about 10 to 200 mm and a pitch of at least 2 mm.

The extruder 5 is placed above washing tank 10 which is continuously filled with fresh cold water C but it is so disposed such that the greater portion of the downwardly extending supply nozzles 9 is immersed in the cold water C. Therefore, the dispersion L in the chamber 7 of the extruder 5 substantially retains the temperature at which it was supplied into the extruder and flows down through the supply nozzles 9 at uniformly distributed pressure. The dispersion L flowing down through the nozzle 9 is cooled by the cold water C through the wall of the nozzle and is rapidly gelled. As a result, the resistance of the inner wall of the nozzle against the flow of the dispersion L builds up to increase the relative speed of the dispersion flowing along the center of the nozzle and which is yet to be gelled thoroughly, and the dispersion comes into contact with the inner wall at the lower portion of the nozzle. In this manner, the fluidity of the dispersion throughout the cross section of the dispersion L at right angles to the direction in which it flows is gradually lost, with the result that the dispersion L is gelled into the form of a bar having the same cross-sectional shape as that of the nozzle 9. While the bar of gelled dispersion L is forced to flow down through the nozzle 9 by the action of the pressure at which the dispersion is supplied to the extruder 5, the outer periphery of the bar rubs against the inner walls of the nozzle, which not only causes further gelation of the dispersion but provides the bar with a smooth surface. The noodles released from the outlet of the nozzle are so firm and stable that they will not lose their shape by swelling or during washing in cold water C that has a stirring effect on the noodles.

Prior to the noodling operation described above, the position of the extruder 5 relative to the cold water C must be so determined that the cold water C does not enter the chamber 7 to be mixed with the dispersion L supplied to the extruder. But once the noodles are forming, the chamber 7, to say nothing of the supply nozzles 9, may be entirely immersed in the cold water C to a depth that is not so great as to lower appreciably the pressure at which the dispersion is being supplied.

The noodles prepared in the manner described above are immersed in the cold water C for a given period of time during which the unwanted water-soluble by-products dissolve in the cold water C and are discharge out of the washing tank 10 together with the cold water C.

The connecting portion 6, chamber 7 and the bottom 8 of the extruder 5 may be composed of a good heat conductor as with the nozzle 9, but if they are composed of a good heat conductor, the members other than the nozzle 9 had not better be immersed in the cold water even after the formation of the noodles.

As a modification of the extruder 5, a spherical, rather than conical, chamber 7 may be used which is provided with supply nozzles 9 that project radially from the walls of the chamber.

Since the extruder 5 is provided at the bottom 8 of the extruder with at least one supply nozzle 9 made of a good heat conductor and which is immersed in the cold water C of the washing tank 10, the temperature gradient of the dispersion L for noodling, i.e., the gradient of gelling speed can be set at any value within a wide range by properly determining the overall length l and the inside diameter ID of the nozzle 9. In addition, rubbing of the surface of the gelled dispersion L against the inner walls of the nozzle 9 prevents a gel having burr-like projections on the surface from being extruded through the nozzle 9 into the cold water C. As a result, not only is considerable loss in the shape of the noodles in the cold water C eliminated but also loss of many noodles through breaking is avoided.

Provision of the nozzle 9 results in more freedom in designing the supply rate and pressure of the dispersion L, and it also contributes to minimum increase in the load on the apparatus supplying the cold water C.

The complexity of the apparatus is minimal and the apparatus features a compact construction.

Such novel advantages of the apparatus of this invention are hereunder illustrated by the following examples which are by no means intended to limit the scope of this invention.

EXAMPLE 1

Figure 2:
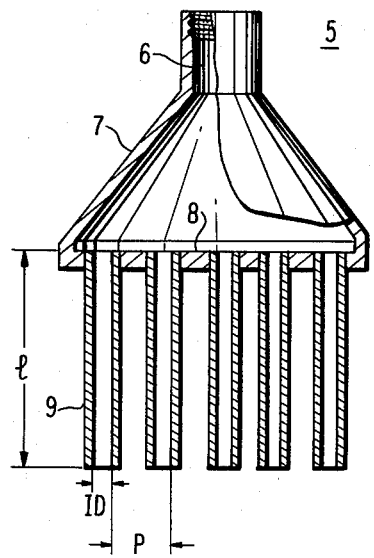
FIG. 2 is a side view of an extruder, with a portion cut away, that is one element of the apparatus shown in FIG. 1.

A photosensitive silver halide emulsion of the composition identified below was freed of the unwanted water-soluble by-product and auxiliary solvent by washing with cold water while noodles of the emulsion were continuously formed in one embodiment of the apparatus of this invention illustrated in FIGS. 1 and 2. Detailed conditions for the noodling and its results are set forth in Table 1 below.

Composition of the Photosensitive Silver Halide Emulsion

| | |
|---|---|
| Silver Chloride | 6 kg |
| Silver Bromide | 3 kg |
| Gelatin | 8.5 kg |
| Water and Others | 82.5 l |
| | 100 kg |

TABLE 1

| | Noodling Conditions | | | | | | | | | | | | |
|---|---|---|---|---|---|---|---|---|---|---|---|---|---|
| | Dispersion | | | | Supply Nozzles | | | | | Cold | Noodle | | |
| Run | Temp. (°C.) | Viscosity (cp) | Pressure (Kg/cm². G) | Flow Rate (l/min) | Material | Number | Overall Length (mm) | ID (mm) | Pitch (mm) | Water Temp. (°C.) | Cross-Sectional Shape | Loss (%) | Remarks |
| 1-1 | 29 | 3500 | 0.5 | 2.1 | Stainless steel | 110 | 5.0 | 2.0 | 10.0 | 4 | Elliptical | >25 | Poor |
| 1-2 | " | " | " | " | Stainless steel | " | 10.0 | " | " | " | Elliptical | 15 | Fair |

TABLE 1-continued

| | Noodling Conditions | | | | | | | | | | | | |
|---|---|---|---|---|---|---|---|---|---|---|---|---|---|
| | Dispersion | | | | Supply Nozzles | | | | | Cold Water Temp. (°C.) | Noodle Cross-Sectional Shape | Loss (%) | Remarks |
| Run | Temp. (°C.) | Viscosity (cp) | Pressure (Kg/cm². G) | Flow Rate (l/min) | Material | Number | Overall Length (mm) | ID (mm) | Pitch (mm) | | | | |
| 1-3 | " | " | " | " | Stainless steel | " | 50.0 | " | " | " | Circular | 2 | Good |
| 1-4 | " | " | " | " | Stainless steel | " | 200.0 | " | " | " | Circular | " | Good |
| 1-5 | " | " | " | " | Stainless steel | " | 300.0 | " | " | " | Circular with a small burr | 7 | Fair |
| 1-6 | " | " | " | " | Stainless steel | " | 50.0 | 0.3 | " | " | Circular | 3 | Good |
| 1-7 | " | " | " | " | Stainless steel | " | " | 3.0 | " | " | Circular | " | Good |
| 1-8 | " | " | " | " | Stainless steel | " | " | 5.0 | " | " | Elliptical | 20 | Poor |
| 1-9 | " | " | " | " | Stainless steel | " | " | 1.3 | 4.0 | " | Circular | 2 | Good |
| 1-10 | " | " | " | " | Stainless steel | " | " | " | 1.0 | " | Cohering noodles would break up | 18 | Poor |
| 1-11 | " | " | 1.0 | 6.3 | Stainless steel | 330 | 50.0 | 2.0 | 10.0 | " | Circular | 3 | Good |
| 1-12 | " | " | " | " | Stainless steel | " | " | 5.0 | " | " | Elliptical | 25 | Poor |
| 1-13 | " | " | " | " | Stainless steel | " | " | 2.0 | 1.0 | " | Cohering noodles would break up | 17 | Poor |
| 1-14 | " | " | " | " | Aluminum | " | 10.0 | 0.3 | 2.0 | " | Circular | 3 | Good |
| 1-15 | " | " | " | " | " | " | " | 4.0 | " | " | Circular | " | Good |
| 1-16 | " | " | 0.5 | 2.1 | " | 110 | " | 0.3 | " | " | Circular | 2 | Good |
| 1-17 | " | " | " | " | " | " | " | 4.0 | " | " | Circular | " | Good |

EXAMPLE 2

A color-forming coupler composition noted below was freed of the unwanted water-soluble by-product and auxiliary solvent by washing with cold water while noodles of the coupler were continuously formed in the apparatus of Example 1. Detailed conditions for the noodling and its results are set forth in Table 2 below.

Color-Forming Coupler Composition

| | |
|---|---|
| Cyan Forming Coupler, 2-[α-(2,4-di-t-amylphenoxy)butyl-amide]-4,6-dichloro-5-methylphenol | 20 kg |
| Dibutyl Phthalate | 10 l |
| Ethyl Acetate | 30 l |
| Water | 258 l |
| Sodium Lauryl Benzenesulfonate | 0.8 kg |
| Gelatin | 29 kg |
| | 345 kg |

TABLE 2

| | Noodling Conditions | | | | | | | | | | | | |
|---|---|---|---|---|---|---|---|---|---|---|---|---|---|
| | Dispersion | | | | Supply Nozzles | | | | | Cold Water Temp. (°C.) | Noodel Cross-Sectional Shape | Loss (%) | Remarks |
| Run | Temp. (°C.) | Viscosity (cp) | Pressure (Kg/cm². G) | Flow Rate (l/min) | Material | Number | Overall Length (mm) | ID (mm) | Pitch (mm) | | | | |
| 2-1 | 29 | 4100 | 1.4 | 6.3 | Stainless Steel | 330 | 5.0 | 2.0 | 10.0 | 4 | Elliptical | 25 | Poor |
| 2-2 | " | " | " | " | Stainless Steel | " | 10.0 | " | " | " | Elliptical | 13 | Fair |
| 2-3 | " | " | " | " | Stainless Steel | " | 50.0 | " | " | " | Circular | 3 | Good |
| 2-4 | " | " | " | " | Stainless Steel | " | 300.0 | " | " | " | Circular with a small burr | 6 | Fair |
| 2-5 | " | " | " | " | Stainless Steel | " | 50.0 | 4.0 | " | " | Circular | 3 | Good |
| 2-6 | " | " | " | " | Stainless Steel | " | " | 5.0 | " | " | Elliptical | 20 | Poor |
| 2-7 | " | " | " | " | Stainless Steel | " | " | 2.0 | 2.0 | " | Circular | 3 | Good |
| 2-8 | " | " | " | " | Stainless Steel | " | " | " | 1.0 | " | Cohering noodles would break up | 17 | Poor |
| 2-9 | 39 | 520 | 0.6 | 6.0 | Stainless | " | 5.0 | 2.0 | 10.0 | 4 | Elliptical | >25 | Poor |

TABLE 2-continued

| | Noodling Conditions | | | | | | | | | | | | |
|---|---|---|---|---|---|---|---|---|---|---|---|---|---|
| | Dispersion | | | | Supply Nozzles | | | | | Cold Water Temp. (°C.) | Noodel Cross-Sectional Shape | Loss (%) | Remarks |
| Run | Temp. (°C.) | Viscosity (cp) | Pressure (Kg/cm². G) | Flow Rate (l/min) | Material | Number | Overall Length (mm) | ID (mm) | Pitch (mm) | | | | |
| 2-10 | " | " | " | " | Stainless Steel | " | 10.0 | " | " | " | Elliptical | 15 | Fair |
| 2-11 | " | " | " | " | Stainless Steel | " | 50.0 | " | " | " | Circular | 3 | Good |
| 2-12 | " | " | " | " | Stainless Steel | " | 350.0 | " | " | " | Circular | 5 | Good |
| 2-13 | " | " | " | " | Stainless Steel | " | 400.0 | " | " | " | Circular with a small burr | 10 | Fair |
| 2-14 | " | " | " | " | Stainless Steel | " | 50.0 | 2.0 | 2.0 | " | Circular | 3 | Good |
| 2-15 | " | " | " | " | Stainless Steel | " | " | 4.0 | " | " | Circular | " | Good |

While the invention has been described un detail and with reference to specific embodiments thereof, it will be apparent to one skilled in the art that various changes and modifications can be made herein without departing from the spirit and scope thereof.

What is claimed is:

1. A process for noodling a gelatin dispersion comprising applying a predetermined quantity of a gelatin dispersion to an extruder at a predetermined pressure, wherein the extruder comprises a plurality of supply nozzles extending beyond a chamber for receiving the dispersion into a washing tank with free access to cold water, said supply nozzles of said extruder being so arranged as to be immersed in the cold water in said washing tank, whereby gelation and noodling of said dispersion flowing through each of said nozzles is achieved with firmer and more stable noodles being fed into said cold water.

2. An apparatus for noodling a gelatin dispersion which continuously gels and noodles the gelatin dispersion and supplies noodles of the dispersion into cold water in a washing tank, said apparatus comprising means for supplying a predetermined quantity of said dispersion to an extruder at a predetermined pressure, said extruder comprising a plurality of supply nozzles that extend beyond a chamber for receiving said dispersion and a washing tank to which cold water has free access, the supply nozzles of said extruder being so arranged as to be immersed in the cold water in said washing tank, to thereby promote gelation of said dispersion flowing down through each of said nozzles and to form firmer and stabler noodles to be fed into said cold water.

3. The apparatus for noodling of claim 1 wherein the supply nozzles are made of stainless steel, brass or aluminum.

4. The apparatus for noodling of claims 1 or 2 wherein each of the supply nozzles of said extruder has an inside diameter of about 0.3 to 4.0 mm and an overall length of about 10 t 200 mm and is projected at a pitch of at least 2 mm.

5. The apparatus for noodling of claim 1 wherein said supply nozzles are made of a material having higher thermal conductivity than that of the walls of said chamber.

* * * * *